United States Patent
Schmidt et al.

(10) Patent No.: US 10,006,304 B2
(45) Date of Patent: Jun. 26, 2018

(54) COMPONENT WITH EMBEDDED SENSOR

(71) Applicant: UNITED TECHNOLOGIES CORPORATION, Farmington, CT (US)

(72) Inventors: Wayde R. Schmidt, Pomfret Center, CT (US); Slade R. Culp, Coventry, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 87 days.

(21) Appl. No.: 15/036,989

(22) PCT Filed: Nov. 14, 2014

(86) PCT No.: PCT/US2014/065744
§ 371 (c)(1),
(2) Date: May 16, 2016

(87) PCT Pub. No.: WO2015/073852
PCT Pub. Date: May 21, 2015

(65) Prior Publication Data
US 2016/0305271 A1    Oct. 20, 2016

Related U.S. Application Data

(60) Provisional application No. 61/904,749, filed on Nov. 15, 2013.

(51) Int. Cl.
F01D 21/00    (2006.01)
F01D 17/08    (2006.01)
(Continued)

(52) U.S. Cl.
CPC .......... *F01D 17/085* (2013.01); *B32B 15/043* (2013.01); *B32B 15/14* (2013.01);
(Continued)

(58) Field of Classification Search
CPC .................................................... F01D 21/003
(Continued)

(56) References Cited

U.S. PATENT DOCUMENTS 5,191,791 A  *  3/1993  Gerardi ................. B64D 15/16
                                                   73/178 R
5,206,806 A      4/1993  Gerardi et al.
(Continued)

FOREIGN PATENT DOCUMENTS

EP    1593595 B1    9/2011
EP    2159559 B1    7/2012
(Continued)

OTHER PUBLICATIONS

European Search Report for European Patent Application No. 14862211.1, completed Jun. 6, 2017.

*Primary Examiner* — Clayton E Laballe
*Assistant Examiner* — Kevin Butler
(74) *Attorney, Agent, or Firm* — Carlson, Gaskey & Olds, P.C.

(57) ABSTRACT

One exemplary embodiment of this disclosure relates to an article having a multi-layer wall structure having an embedded sensor. Further, the multi-layer wall structure and the sensor are bonded together.

21 Claims, 3 Drawing Sheets

(51) Int. Cl.
- *F01D 5/14* (2006.01)
- *F01D 17/04* (2006.01)
- *G01K 1/14* (2006.01)
- *G01D 11/30* (2006.01)
- *G01K 7/02* (2006.01)
- *G01L 19/08* (2006.01)
- *B32B 15/04* (2006.01)
- *B32B 15/14* (2006.01)
- *B32B 15/18* (2006.01)
- *B64D 45/00* (2006.01)
- *G01L 19/16* (2006.01)
- *G01M 15/14* (2006.01)
- *B22F 3/105* (2006.01)
- *B22F 7/06* (2006.01)
- *B33Y 10/00* (2015.01)
- *B33Y 80/00* (2015.01)
- *B23K 20/10* (2006.01)

(52) U.S. Cl.
CPC .............. *B32B 15/18* (2013.01); *B64D 45/00* (2013.01); *F01D 5/147* (2013.01); *F01D 17/04* (2013.01); *F01D 17/08* (2013.01); *G01D 11/30* (2013.01); *G01K 1/14* (2013.01); *G01K 7/02* (2013.01); *G01L 19/083* (2013.01); *G01L 19/16* (2013.01); *G01M 15/14* (2013.01); *B22F 3/1055* (2013.01); *B22F 7/06* (2013.01); *B23K 20/103* (2013.01); *B32B 2603/00* (2013.01); *B32B 2605/18* (2013.01); *B33Y 10/00* (2014.12); *B33Y 80/00* (2014.12); *B64D 2045/0085* (2013.01); *F05D 2220/32* (2013.01); *G01K 2205/00* (2013.01); *Y02P 10/295* (2015.11); *Y02T 50/672* (2013.01)

(58) Field of Classification Search
USPC .......................................................... 73/112
See application file for complete search history.

(56) References Cited

U.S. PATENT DOCUMENTS

| | | | | | |
|---|---|---|---|---|---|
| 5,247,766 | A | * | 9/1993 | Kildea | B24C 1/04 451/36 |
| 6,940,186 | B2 | * | 9/2005 | Weitkamp | F03D 7/042 290/44 |
| 7,464,603 | B2 | * | 12/2008 | Bauer | G01L 19/0069 257/678 |
| 8,991,241 | B1 | * | 3/2015 | Zhang | G01N 23/046 73/112.01 |
| 2004/0202886 | A1 | * | 10/2004 | Subramanian | C23C 4/18 428/632 |
| 2007/0285110 | A1 | * | 12/2007 | Nigmatulin | F01D 11/08 324/699 |
| 2009/0013693 | A1 | * | 1/2009 | Ols | F23N 1/005 60/735 |
| 2011/0143042 | A1 | * | 6/2011 | Peretti | B23K 9/04 427/455 |
| 2016/0135279 | A1 | * | 5/2016 | Sheedy | H05K 1/0201 73/112.01 |
| 2016/0305271 | A1 | * | 10/2016 | Schmidt | F01D 5/147 |
| 2017/0145924 | A1 | * | 5/2017 | Zhang | G01M 15/14 |

FOREIGN PATENT DOCUMENTS

| | | |
|---|---|---|
| EP | 2525044 A2 | 11/2012 |
| EP | 2586972 A2 | 5/2013 |
| GB | 2469516 A | 10/2016 |
| WO | 2011064125 A1 | 6/2011 |

* cited by examiner

COMPONENT WITH EMBEDDED SENSOR

BACKGROUND

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. Sensors, such as optical fibers, pressure transducers, thermocouples, strain gauges, etc., may be provided adjacent to an airfoil section of a blade or vane to monitor the health and conditions of the associated component. In one example, a sensor blanket is provided over the airfoil section. In another example, cavities are machined into the airfoil section, and sensors are inserted into the cavities.

SUMMARY

One exemplary embodiment of this disclosure relates to an article having a multi-layer wall structure having an embedded sensor. Further, the multi-layer wall structure and the sensor are bonded together.

In a further embodiment of any of the foregoing, the multi-layer wall structure includes a plurality of metallic layers, the sensor bonded to at least two of the metallic layers.

In a further embodiment of any of the foregoing, each of the metallic layers includes more than one piece of material, wherein adjacent pieces of material establish a seam where the pieces of material abut one another, and wherein the metallic layers are arranged such that the seams are staggered relative to the seams of adjacent layers.

In a further embodiment of any of the foregoing, the metallic layers include at least one of nickel (Ni), steel, cobalt (Co), and titanium (Ti).

In a further embodiment of any of the foregoing, at least one of the metallic layers has a different chemical composition from at least one other metallic layer.

In a further embodiment of any of the foregoing, the sensor includes an optical fiber.

In a further embodiment of any of the foregoing, the multi-layer wall structure includes a plurality of sensors.

In a further embodiment of any of the foregoing, the plurality of sensors are selected from the group consisting of optical fibers, pressure transducers, temperature sensors, position sensors, and strain gauges.

In a further embodiment of any of the foregoing, the sensor is metallurgically bonded to the multi-layer wall structure during forming of the multi-layer wall structure.

In a further embodiment of any of the foregoing, the multi-layer wall structure includes a substantially arcuate shape, and wherein the multi-layer wall structure provides a portion of a leading edge of an airfoil section of an engine component.

In a further embodiment of any of the foregoing, the multi-layer wall structure includes at least one of an energy harvesting layer, a communications layer, and a computation layer.

Another exemplary embodiment of this disclosure relates to a method of forming an aircraft component. The method includes embedding a sensor into a wall, with the sensor bonded to the wall. The method further includes forming a portion of an aircraft component with the wall.

In a further embodiment of any of the foregoing, the embedding step includes joining at least one layer of metallic material to the sensor.

In a further embodiment of any of the foregoing, the at least one layer of metallic material and the sensor are joined using an ultrasonic welding process.

In a further embodiment of any of the foregoing, the method includes shaping the wall to correspond to a portion of the aircraft component, the wall shaped to include a bend.

In a further embodiment of any of the foregoing, the wall provides a leading edge of the aircraft component.

Another exemplary embodiment of this disclosure relates to a method of forming an engine component. The method includes additively forming a wall by bonding a plurality of metal layers together using an ultrasonic welding process. Further included is a step of embedding a sensor into the wall by bonding the sensor to the metal layers during the additive forming step. The method further includes forming a portion of an engine component with the wall.

In a further embodiment of any of the foregoing, the metal layers include at least one of nickel (Ni), steel, cobalt (Co), and titanium (Ti).

In a further embodiment of any of the foregoing, each of the metal layers includes a plurality of pieces of material, wherein adjacent pieces of material establish a seam, and wherein the metal layers are arranged such that the seams of adjacent layers are staggered relative to one another.

In a further embodiment of any of the foregoing, the sensor is selected from the group consisting of optical fibers, pressure transducers, temperature sensors, position sensors, and strain gauges.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
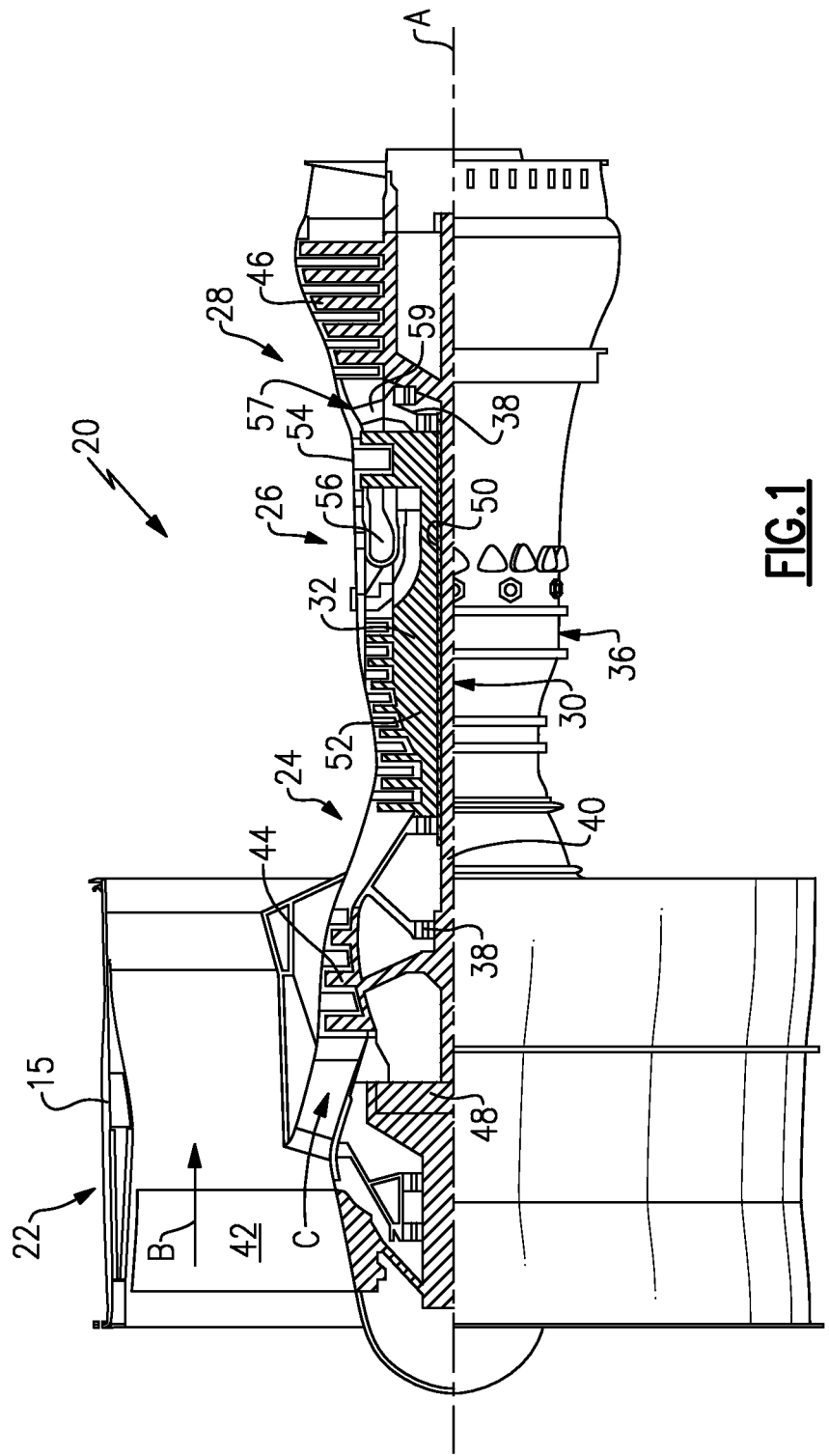
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 2:
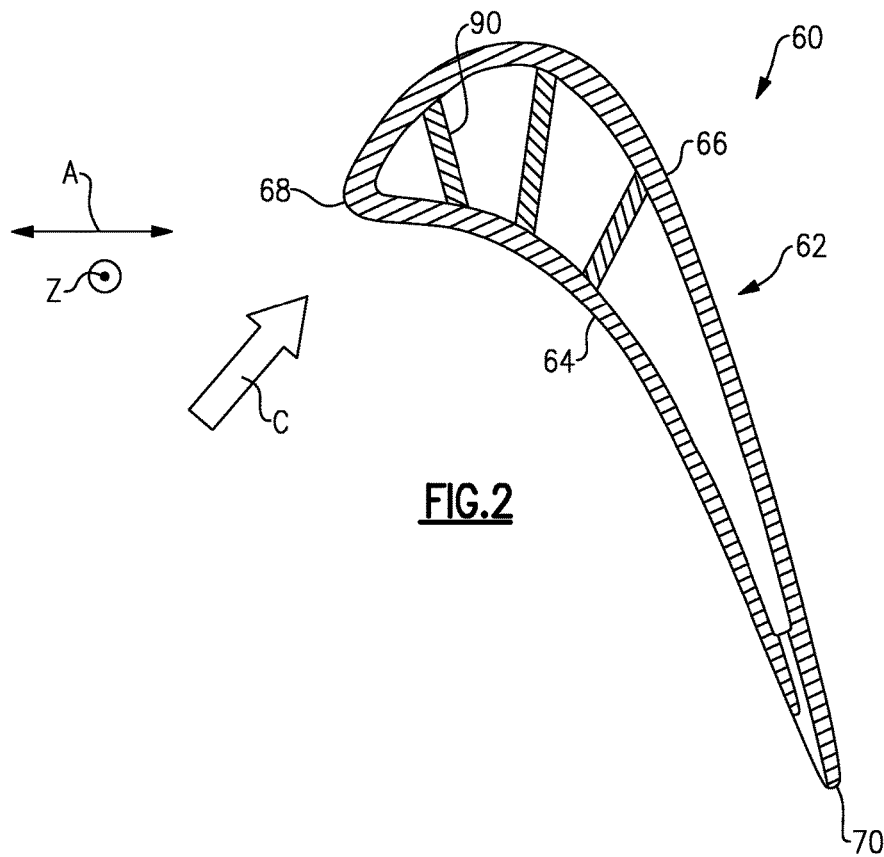
FIG. 2 is a cross-sectional view of an example engine component.

FIG. 2 is a cross-sectional view of an example engine component 60. In this example, the engine component 60 is a rotor blade. It should be understood that this disclosure extends to other engine components, such as stator vanes and blade outer air seals (BOAS), as examples. It should also be understood that this disclosure extends to other aircraft components including non-engine airfoils such as nacelles, aircraft wings, rotorcraft blades and the like.

The engine component 60 includes an airfoil section 62 extending radially, in the radial direction Z (which is normal to the engine central longitudinal axis A), from a root to a tip. The airfoil section 62 includes pressure and suction side walls 64, 66 extending generally axially between a leading edge 68 and a trailing edge 70.

When mounted in an engine, the airfoil section 62 is provided in the core flow path C, which includes relatively hot gases. Accordingly, it may be useful to sense certain conditions and parameters of the component 60 (such as the state-of-wear, temperature, pressure, position, strain, etc.) to monitor the engine component 60 for health, expected component life, performance feedback for engine control, etc. This disclosure relates to a method for incorporating one or more sensors into a portion of the engine component 60.

Figure 3:
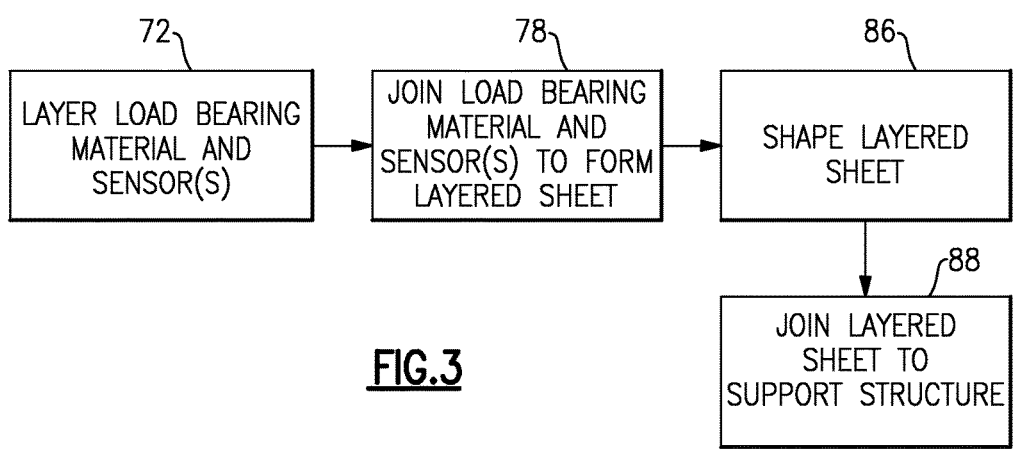
FIG. 3 represents an example method according to this disclosure.
Figure 4A:
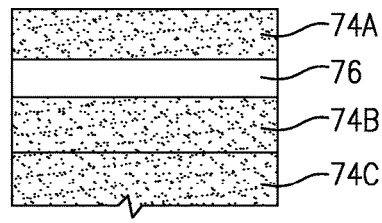
FIG. 4A illustrates a plurality of layers of material.

An example method for forming a portion (such as the leading edge 68) of the engine component 60 is shown in FIG. 3. At 72, a plurality of layers of load bearing material 74A-74C are provided relative to a sensor 76, as shown in FIG. 4A. As will be explained below, the sensor 76 is provided between adjacent layers of load bearing material 74A-74C, and is bonded between at least two of the layers in one example.

In this example, the load bearing materials 74A-74C are an erosion resistant material. In one example, the load bearing material is a metallic material selected from a group including at least one of nickel (Ni), steel, titanium (Ti), cobalt (Co), including their alloys, or the like. Adjacent layers of load bearing material 74A-74C may be made of different materials (e.g., having different chemical compositions), to provide a graded cross-section. In another example, the load bearing material is a polymer matrix composite, an organic matrix composite, a glass matrix composite, a ceramic matrix composite, a metal matrix composite, or a combination of these with or without metallic material layers.

The sensor 76 is selected from a non-exhaustive list of optical fibers, pressure transducers, temperature sensors (thermocouples), strain gauges, position sensors, etc., including combinations thereof. Sensor 76 could be made elsewhere and integrated during manufacturing or manufactured directly into the article during processing using an additive technique. While only one sensor 76 is illustrated in FIG. 4A, it should be understood that additional sensors may be included (as in FIG. 4E). Further, in examples with multiple sensors, the sensors may be different types.

Figure 4B:
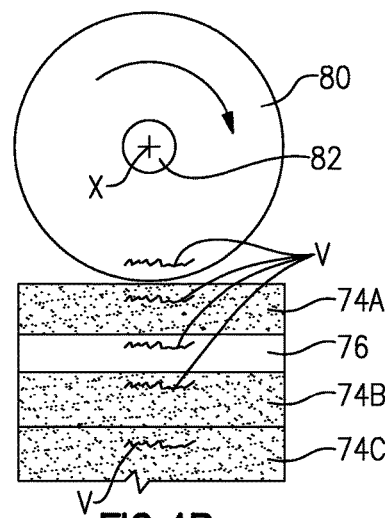
FIG. 4B schematically illustrates a process for joining a plurality of layers of material.

At 78, the layers of are joined together. In one example, the load bearing materials 74A-74C and the sensor 76 are joined using an additive manufacturing technique. As used herein, the term "additive" refers to building a structure from separate layers, as opposed to machining a structure from a stock of material, for example. FIG. 4B illustrates one example an additive manufacturing technique known as ultrasonic welding.

In FIG. 4B, a horn 80 is in communication with ultrasonic transducers 82, which generate ultrasonic vibrations, schematically illustrated at V. In one example, the horn 80 is cylindrical, and is configured to roll along the layers of material, about an axis X, while transferring the vibrations V into the layers of material.

The vibrations V are transferred from the horn 80 to the load bearing materials 74A-74C and the sensor 76. In turn, the vibrations V create friction between the adjacent layers of material, which ultimately creates a bond, such as a metallurgical bond, between the adjacent layers of load bearing material 74A-74C and the sensor 76. While a stack of four layers (e.g., the load bearing material 74A-74C and the sensor 76) is illustrated in FIG. 4B, in some examples only two layers are joined together at a time, with subsequent layers being added to the previously joined layers. Further, while only three layers 74A-74C are illustrated in FIGS. 4A-4D, it should be understood that additional layers of load bearing material may be included.

While ultrasonic welding is discussed above, other additive manufacturing techniques come within the scope of this disclosure. Other example additive manufacturing techniques include direct metal laser sintering (DMLS), electron beam melting (EBM), electron beam wire deposition (EBWD), laser powder deposition (LPD), and laser powder plasma spray (LPPS). The use of multiple additive manufacturing methods in combination is also contemplated in this disclosure.

Figure 4C:
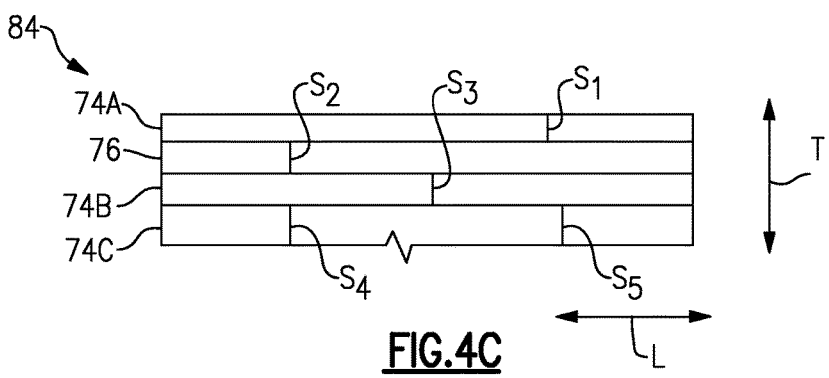
FIG. 4C illustrates a layered sheet.

FIG. 4C illustrates a layered sheet, or laminate, 84 formed from step 78. The layered sheet 84 may be referred to herein as a wall, or a multi-layered wall structure (as the sheet 84 may ultimately become a wall of the component 60). After forming, at 78, the layered sheet 84 includes substantially no gaps between adjacent layers 74A-74C, 76 in the direction of the thickness T.

Each layer 74A-74C, 76 of the sheet 84 may include several pieces of material provided adjacent one another, as indicated at the seams $S_1$-$S_5$. In this example, the seams $S_1$-$S_5$ of adjacent layers are staggered, and do not line up in the direction of the thickness T of the layered sheet 84. Staggering the seams $S_1$-$S_5$ reduces the likelihood of delamination, and increases the structural integrity of the layered sheet 84.

Figure 4D:
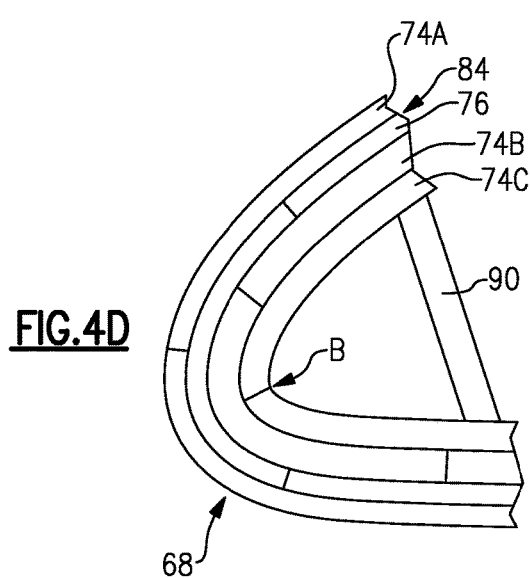
FIG. 4D illustrates an engine component including a layered sheet.

After the layered sheet 84 is formed, the layered sheet 84 is shaped, at 86, to correspond to a desired shape for a portion of the engine component 60. In one example, the layered sheet 84 provides a leading edge 68 of the engine component 60. In this example, the layered sheet 84 is formed to provide the leading edge 68 with a bend, at B (FIG. 4D). The layered sheet 84 may provide other portions of the engine component 60, and is not limited to the leading edge 68.

The shaped layered sheet 84 is joined, by welding for example, to another portion the engine component 60, at 88. As illustrated in FIG. 4D, the layered sheet 84 may be joined with a radially extending support, or spar, 90, which in one example extends outward from a root, or platform, of the engine component 60. In the example of FIG. 4D, the layered sheet 84 is arranged such that a layer of load bearing material 74A protects the sensor 76 from direct exposure to the core flow path C. While only one protective layer 74A is illustrated, additional layers may be provided between the sensor 76 and the core flow path C.

Figure 4E:
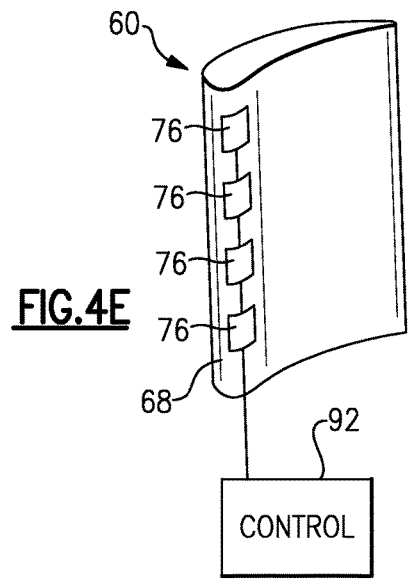
FIG. 4E illustrates an engine component including a plurality of sensors.

As mentioned above, the layered sheet 84 may include more than one sensor. As generally illustrated in FIG. 4E, there may be several spaced-apart sensors 76 along the leading edge 68 (e.g., extending in-and-out of the page relative to FIG. 4D). These sensors 76 may further be in communication with a control 92 configured to read the data from the sensor 76, either wirelessly or by way of a wired connection.

In some examples, the sensor 76 may require power. In these examples, the sensor 76 may be powered from a source spaced-apart from the engine component 60, or the layered sheet 84 may incorporate an energy harvesting layer, a wired or wireless communications layer, and/or a logic/computation layer, or combinations thereof. An energy harvesting layer may include a piezoelectric generator, as an example, configured to generate energy to power the sensor 76. The layered sheet 84 could alternatively include a battery for powering the sensor 76. A communications layer could include an antenna for interaction with sensor 76 or the control 92. A logic/computation layer could include integrated circuitry, memory and embedded algorithms for data and signal processing.

This disclosure provides an engine component with at least one sensor embedded into a load bearing material. Accordingly, the sensor(s) are reliably mounted to the engine component 60, and provide accurate information (such as the state of wear, temperature, pressure, strain, etc.) about the engine component 60.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. An article, comprising:
    a multi-layer wall structure including an embedded sensor, the multi-layer wall structure and the sensor bonded together, wherein the article is configured for use in a gas turbine engine, and, when the article is in use, at least one layer of the multi-layer wall structure covers the sensor and protects the sensor from exposure to a core flow path of the gas turbine engine.

2. The article as recited in claim 1, wherein the multi-layer wall structure includes a plurality of metallic layers, the sensor bonded to at least two of the metallic layers.

3. The article as recited in claim 2, wherein each of the metallic layers includes more than one piece of material, wherein adjacent pieces of material establish a seam where the pieces of material abut one another, and wherein the metallic layers are arranged such that the seams are staggered relative to the seams of adjacent layers.

4. The article as recited in claim 2, wherein the metallic layers include at least one of nickel (Ni), steel, cobalt (Co), and titanium (Ti).

5. The article as recited in claim 4, wherein at least one of the metallic layers has a different chemical composition from at least one other metallic layer.

6. The article as recited in claim 1, wherein the sensor includes an optical fiber.

7. The article as recited in claim 1, wherein the multi-layer wall structure includes a plurality of sensors.

8. The article as recited in claim 7, wherein the plurality of sensors are selected from the group consisting of optical fibers, pressure transducers, temperature sensors, thermocouples, position sensors, and strain gauges.

9. The article as recited in claim 1, wherein the sensor is metallurgically bonded to the multi-layer wall structure during forming of the multi-layer wall structure.

10. The article as recited in claim 1, wherein the multi-layer wall structure includes at least one of an energy harvesting layer, a communications layer, and a computation layer.

11. The article as recited in claim 1, wherein, when the article is in use, the at least one layer of the multi-wall structure is between the sensor and the core flow path and completely covers the sensor.

12. An article, comprising:
a multi-layer wall structure including an embedded sensor, the multi-layer wall structure and the sensor bonded together, wherein the multi-layer wall structure includes a substantially arcuate shape, and wherein the multi-layer wall structure provides a portion of a leading edge of an airfoil section of an engine component.

13. A method of forming an aircraft component, comprising:
embedding a sensor into a wall, the sensor bonded to the wall; and
forming a portion of an aircraft component with the wall, wherein the wall is configured to be exposed to a core flow path of a gas turbine engine when the aircraft component is in use, and wherein the sensor is embedded into the wall such that the wall protects the sensor from direct exposure to the core flow path.

14. The method as recited in claim 13, wherein embedding step includes joining at least one layer of metallic material to the sensor.

15. The method as recited in claim 14, wherein the at least one layer of metallic material and the sensor are joined using an ultrasonic welding process.

16. The method as recited in claim 13, including shaping the wall to correspond to a portion of the aircraft component, the wall shaped to include a bend.

17. The method as recited in claim 16, wherein the wall provides a leading edge of the aircraft component.

18. The method as recited in claim 13, wherein the sensor is embedded into the wall such that a portion of the wall between the sensor and the core flow path completely covers the sensor.

19. A method of forming an engine component, comprising:
additively forming a wall by bonding a plurality of metal layers together using an ultrasonic welding process;
embedding a sensor into the wall by bonding the sensor to the metal layers during the additive forming step, wherein each of the metal layers includes a plurality of pieces of material, wherein adjacent pieces of material establish a seam, and wherein the metal layers are arranged such that the seams of adjacent layers are staggered relative to one another; and
forming a portion of an engine component with the wall.

20. The method as recited in claim 19, wherein the metal layers include at least one of nickel (Ni), steel, cobalt (Co), and titanium (Ti).

21. The method as recited in claim 19, wherein the sensor is selected from the group consisting of optical fibers, pressure transducers, temperature sensors, position sensors, and strain gauges.

* * * * *